(12) United States Patent
Gemmeke et al.

(10) Patent No.: US 9,477,419 B2
(45) Date of Patent: Oct. 25, 2016

(54) MEMORY CONTROL SYSTEM FOR A NON-VOLATILE MEMORY AND CONTROL METHOD

(71) Applicant: Stichting IMEC Nederland, Eindhoven (NL)

(72) Inventors: Tobias Gemmeke, Straelen (DE); Julien Penders, Liège (BE); Carlos Agell, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 63 days.

(21) Appl. No.: 14/579,827

(22) Filed: Dec. 22, 2014

(65) Prior Publication Data

US 2015/0309753 A1    Oct. 29, 2015

(51) Int. Cl.
*G06F 3/06* (2006.01)
*G06F 13/16* (2006.01)

(52) U.S. Cl.
CPC .......... *G06F 3/0625* (2013.01); *G06F 3/0653* (2013.01); *G06F 3/0679* (2013.01); *G06F 13/1668* (2013.01); *Y02B 60/1228* (2013.01)

(58) Field of Classification Search
None
See application file for complete search history.

(56) References Cited

U.S. PATENT DOCUMENTS

| 5,930,168 A | 7/1999 | Roohparvar |
| 7,596,707 B1 | 9/2009 | Vemula |
| 2009/0213679 A1 | 8/2009 | Leutgeb et al. |
| 2012/0023348 A1 | 1/2012 | Byom et al. |
| 2012/0023351 A1 | 1/2012 | Wakrat et al. |
| 2012/0331207 A1 | 12/2012 | Lassa et al. |
| 2012/0331282 A1 | 12/2012 | Yurzola et al. |
| 2013/0275691 A1* | 10/2013 | Chew ............... G06F 12/00 711/154 |

FOREIGN PATENT DOCUMENTS

| EP | 1818830 A2 | 8/2007 |
| GB | 2464495 A | 4/2010 |

OTHER PUBLICATIONS

Takeuchi, Ken, "Novel Co-Design of NAND Flash Memory and NAND Flash Controller Circuits for Sub-30 nm Low-Power High-Speed Solid-State Drives (SSD)", IEEE Journal of Solid-State Circuits, vol. 44, No. 4, Apr. 2009, pp. 1227-1234.
European Search Report, European Patent Application 13197379.4 dated Jun. 12, 2014.

* cited by examiner

*Primary Examiner* — Kevin Verbrugge
(74) *Attorney, Agent, or Firm* — McDonnell Boehnen Hulbert & Berghoff LLP

(57) ABSTRACT

A memory control system for controlling read and write operations of a non-volatile memory, wherein the memory control system comprises a memory controller that is adapted to implement a write operation for writing at least one block of data to the memory as a sequence of memory write and validation cycles for part of all of the data. In one example, the number of cycles is a function of the amount of successfully written data per cycle and is thus variable in dependence on the success of the data writing. The system also includes a power management unit, which is adapted to authorize or prevent the memory controller from conducting the write operation at the level of the write cycles thereby to control the timing of power consumption resulting from the cycles of the write operation.

16 Claims, 4 Drawing Sheets

(a)

(b)

MEMORY CONTROL SYSTEM FOR A NON-VOLATILE MEMORY AND CONTROL METHOD

CROSS-REFERENCE TO RELATED APPLICATION

This application claims priority to European Patent Application No. 13197379.4 filed on Dec. 16, 2013, the contents of which are hereby incorporated by reference

FIELD OF THE DISCLOSURE

This disclosure relates to the control of non-volatile memories. In particular, it relates to the use of such memories within systems having other functions which demand power, and where there is a limited total power budget.

BACKGROUND OF THE DISCLOSURE

By way of example, in portable bio-medical sensor devices, it is crucial to conserve energy to extend the runtime of a battery-operated device. Typical applications require wireless communication between the device and a base station when data is to be downloaded, as well as the capture of large amounts of sensor data over a prolonged period of operation.

Nonvolatile memories are typically incorporated into such devices. These are considered to be a low-power solution for long-term data storage as required in wireless sensor devices. One variant of non-volatile memory is the SD-card solution, which offers the benefit of simple replacement of the storage media to exchange data between mobile devices and the base station.

Generally, SD-cards offer sufficient storage but feature high power consumption.

Other examples are small sized embedded flash memories, or up-to multi GByte dedicated chips. Embedded flash memories are typically too small (of the order of MBytes) for the amount of data generated in a sensor device, which is typically in the order of 100 MB to several GB.

Despite the high power consumption involved in wireless transmission, current flash memories have higher energy expenditure for storing the data than the direct wireless feed to the base station. Thus, even when streaming the full sensor data wirelessly, the wireless communication consumes less energy than the data storage function. The capturing of sensor data accounts for about 50% of the total energy expenditure of a wireless sensor device.

In the field of ambulatory cardiac monitoring in particular, existing Holter systems suffer from limited battery autonomy, which is in great part due to the inefficiency of data storage mechanisms. As a result, the recording times are typically limited to 2-3 days, when using batteries of size and weight acceptable to the user (typically 1-2 AAA batteries).

An alternative is to use intermittent monitors, or loop recorders, in which the data is recorded in snapshots around specific events, triggered by the patient or by software. These event recorders typically have 2-4 weeks of autonomy (on 1-2 AAA batteries), but only offer a partial view on the cardiac activity of the patient.

It is widely recognized by the medical community that continuous recording of a biopotential signal, for example, an ECG, for up to 1 month would greatly increase the diagnostic capabilities of ambulatory cardiac monitors, and result in better healthcare delivery to patients.

Flash memories are designed to tolerate some memory cell failures. As the memory cell density is increased, the probability of a failed cell increases. As long as the overall functional capacity increases, the design is improved by having the increased cell density. However, the data writing operation then needs to be designed to include a write validation operation to ensure that a memory block has been correctly written.

Flash memories are therefore written (and read) using a memory controller, which performs validation steps as part of the memory writing function. Essentially, an attempt is made to write a block (or "page") of memory, and the written data is then read to determine if it can indeed be correctly read. As a result, each memory block write (and read) function involves a sequence of cycles. The number of cycles depends on the success of the writing operations. In particular, a write function may be repeated a number of times, and in the event of failure after a number of attempts, the data may be assigned to a different memory allocation.

The result is that the write function (and also the read function) takes a variable amount of time, depending on the success of the write (and read) attempts and depending on the need to change the location to which data is to be written. When a write operation does fail, the data has to be written to a different memory location. This also requires other blocks in the same memory area to be moved to a new location. In consequence, the writing of a single block can result in an extended period of block read and write operations. Finally, all of this has to be tracked in a memory allocation table.

This means that the period of energy expenditure when writing to the memory over time is unpredictable, which limits the possibility of properly distributing the limited power available from the batteries used in such mobile devices. A similar situation arises in connection with memory read cycles, in that different decision thresholds can be applied to determine the quality of the stored data, and different error correction approaches can be applied to enable reliable data reading.

With currently available non-volatile memory controllers this behavior is basically opaque to the power manager. In consequence, the power budget of the system needs to be the sum of the maximum processing power and the maximum flash operation power. In the case of wireless sensor devices, this can basically mean that the maximum power budget has to be doubled. Size requirements in such sensor devices make this a very costly solution.

US 2012/0331282 discloses a system in which a memory access function is allowed or prevented based on the power available at the time. The variable duration of the memory access function as described above presents a limitation on the efficiency of this system as well as preventing the finish time of operations to be predicted.

There is therefore a need for a memory solution which is more power efficient and more predictable in terms of latency. Even with efficient memory storage, wireless communication may still be desired, for example to signal certain system states (such as emergency transmissions, for example in response to heart failure), rather than for streaming raw data.

SUMMARY OF THE DISCLOSURE

According to an example, there is provided a memory control system, for controlling read and write operations of a non-volatile memory. In this example, the memory control system includes a memory controller, which is adapted to implement a write operation for writing at least one block of data to the memory as a sequence of memory write and validation cycles for part of all of the data. The number of cycles is a function of the amount of successfully written data per cycle and is thus variable in dependence on the success of the data writing. The system also includes a power management unit, which is adapted to authorize or prevent the memory controller from conducting the write operation at the level of the write cycles thereby to control the timing of power consumption resulting from the cycles of the write operation.

This memory control system is able to place memory write cycles in time slots where it is known that there is available power budget. By introducing an authorization process to the write-validation cycles (which cycles are only a sub-set of the operations for performing a memory block write), it is possible to predict much more accurately the time during which there will be power demand from the memory controller. Each cycle can thus be considered to be a sub-step or micro-step of the memory write function.

According to an example embodiment, the proposed approach is of particular interest when the writing of data to the memory is not a time critical operation (for example because the data will then be stored for some time before it will need to be accessed), and it can be delayed because a more important process is given higher priority access to the power supply.

The memory controller can be adapted to conduct each write cycle or a set of write cycles by requesting to the power management unit a time period for conducting the write cycle or set of write cycles, receiving an acknowledgement from the power management unit to conduct the write cycle or set of write cycles, and attempting the write cycle or set of write cycles and, if not successful, to start a new cycle or set of cycles. If successful, it can also entail reporting the success to the power management unit.

The new cycle or set of cycles may then require a new request to be made.

The request may not be for every individual attempt to write the memory block. This will depend on the relative durations of the memory write cycle and the time period between other demands for power. It may instead be for a fixed set of cycles. Alternatively, a number of cycles or a time duration may be agreed between the memory controller and the power management unit before another request needs to be made. In general, the solution divides a memory block write function into sub-steps of more accurately known duration, and provides authorization at the level of these sub-steps. The sub-steps can comprise individual or multiple write cycles, individual or multiple write validation cycles, or individual or multiple combinations of write and validation cycles.

The memory controller can also be adapted to implement a read operation for reading at least one block of data from the memory as a sequence of memory read and validation cycles for part or all of the data. The number of cycles may be a function of the amount of successfully read data per cycle and may thus be variable in dependence on the success of the data reading. In one example, the power management unit is adapted to authorize or prevent the memory controller from conducting the read operation at the level of the read cycles, thereby to control the timing of power consumption resulting from the cycles of the read operation.

In this way, the timing of memory read functions can be controlled. Note that the total power consumption during the read function is less relevant for a bulk data download, when a device may be connected to mains. However, the memory read function may be used as part of the checking of write operation, or to extract features of already stored data.

The memory controller can be adapted to conduct each read cycle or a set of read cycles by requesting to the power management unit a time period for conducting the read cycle or set of read cycles, receiving an acknowledgement from the power management unit to conduct the read cycle or set of read cycles, and attempting the read cycle or set of read cycles and if not successful to start a new cycle or set of cycles. Again, if successful, the success can be reported to the power management unit.

This provides a read function which is analogous to the write function.

Thus, in this aspect, a memory block read function into sub-steps of more accurately known duration, and provides authorization at the level of these sub-steps. The sub-steps can comprise individual or multiple read cycles, individual or multiple read verification cycles, or individual or multiple combinations of read and verification cycles.

The disclosure also provides a memory system, comprising a non-volatile memory, and a memory control system for controlling read and write access to the memory. The non-volatile memory can comprise a flash memory.

The disclosure also provides a battery operated device, comprising a memory system, and a main functional unit for performing a device function, wherein the power management unit is adapted to authorize or prevent in dependence on the power demand of the main functional unit.

The main functional unit is then effectively given priority to the power supply, and the demand for power in respect of the memory writing function is met at times which do not coincide with the main functional unit operation.

The main functional unit can for example comprise a bio-sensor monitor, such as a biopotential monitoring device (for ECG, EEG or EMG signal sensing). In an example embodiment, the main functional unit may comprise a cardiac monitoring device, for example a Holter cardiac monitor. Any other portable biosensor can make use of the power controlling approach herein described.

Another aspect provides a method of controlling read and write operations of a non-volatile memory, including implementing a write operation for writing at least one block of data to the memory as a sequence of memory write and validation cycles for part of all of the data. In one example, the number of cycles is a function of the amount of successfully written data per cycle and is thus variable in dependence on the success of the data writing. The method also includes authorizing or preventing the memory controller from conducting the write operation at the level of the write cycles thereby to control the timing of power consumption resulting from the cycles of the write operation.

The method may also comprise implementing a read operation for reading at least one block of data from the memory as a sequence of memory read and validation cycles for part or all of the data, wherein the number of cycles is a function of the amount of successfully read data per cycle and is thus variable in dependence on the success of the data reading, and authorizing or preventing the memory controller from conducting the read operation at the level of the read cycles thereby to control the timing of power consumption resulting from the cycles of the write operation.

BRIEF DESCRIPTION OF THE DRAWINGS

Example embodiments will now be described in detail, with reference to the accompanying drawings, in which.

DETAILED DESCRIPTION OF THE PREFERRED EMBODIMENTS

This application describes a memory control system for controlling read and write operations of a non-volatile memory. The memory write procedure for at least one block of data to be written can comprise a number of write attempts. A power management unit is used to authorize or prevent the memory controller from conducting each individual write attempt or an agreed set of write attempts in order to control the timing of power consumption resulting from the write attempts.

In this application, the term "block" is used to denote the smallest size data set to be written to the memory in one write operation. For some devices this is indeed called a block, but in other devices names such as page and sub-page are used, when the memory is considered to have a multi-layer structure.

According to an example embodiment, the proposed solution enables the power consumption associated with data storage to be decreased to enable longer recording time. For a biomedical sensor application, this in turn increases the diagnostic value of stored data, such as ambulatory cardiac monitoring.

Alternatively, decreasing the power consumption associated with data storage can achieve a similar recording time compared to existing systems but using a smaller battery, therefore decreasing size and weight of the device and improving user comfort. This is of interest for cases in which increasing patient comfort may be even more important than a longer recording time.

By dividing the memory access functions into sequential operations, and providing authorization at the level of the individual operations, the duration of the power demand for each memory access function is more predictable.

Figure 1:
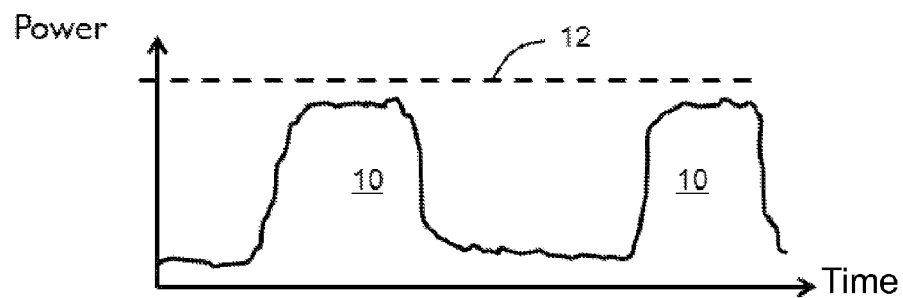
FIG. 1 shows the power demand of a biosensor over time.

FIG. 1 shows the power demand of a biosensor over time. The power demand has bursts 10 of high power demand when measurements are taken. A maximum power budget 12 is set just above the maximum power required to implement the biosensor measurements.

As a result, no significant additional power demand can be tolerated during those periods.

Figure 2:
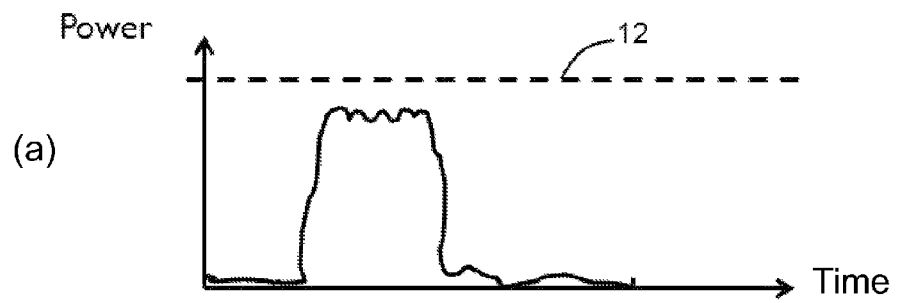
FIG. 2 shows the power demand for a memory write operation of a non-volatile memory such as a flash memory.
Figure 2:
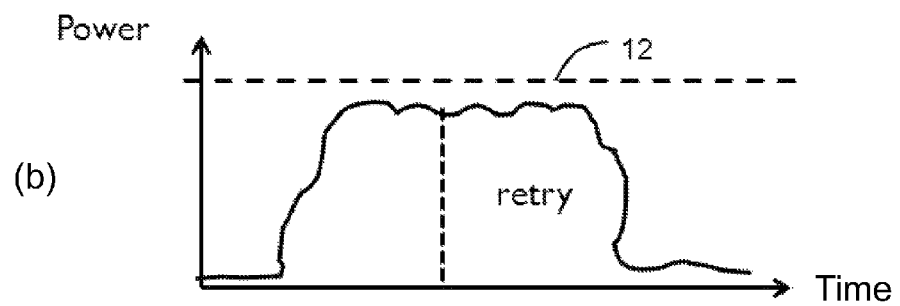

FIG. 2 shows the power demand for a memory write operation of a non-volatile memory such as a flash memory. In FIG. 2(a), a first attempt to write a block of data is successful, giving a short memory write period. FIG. 2(b) shows the power profile when a retry is required.

It can be seen that the power demand is extended over time. The time period required by the write operation cannot be predicted, and this makes timing the memory functions difficult and inefficient.

Figure 3:
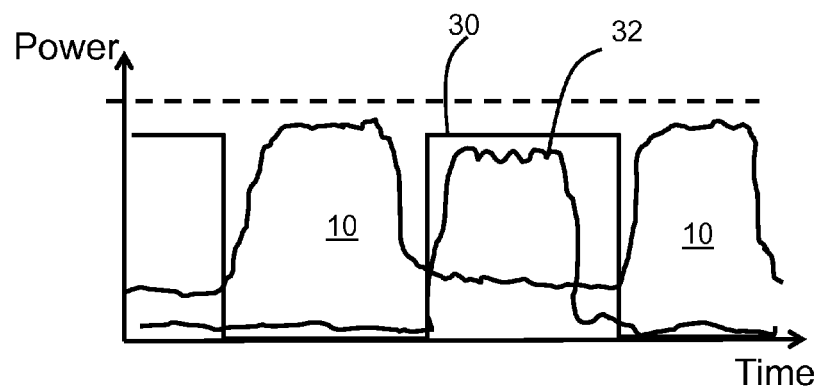
FIG. 3 shows how a memory access window can be defined between power demand bursts of the biosensor.

FIG. 3 shows how a memory access window 30 can be defined between power demand bursts 10 of the biosensor. An example of the power consumed by the memory access function is shown as plot 32.

An example embodiment makes use of a memory controller module that performs control over the individual cycles of at least the write operations of the non-volatile memory. At least the write cycles are controlled so that they are only allowed when there is enough power budget available in the system.

Figure 4:
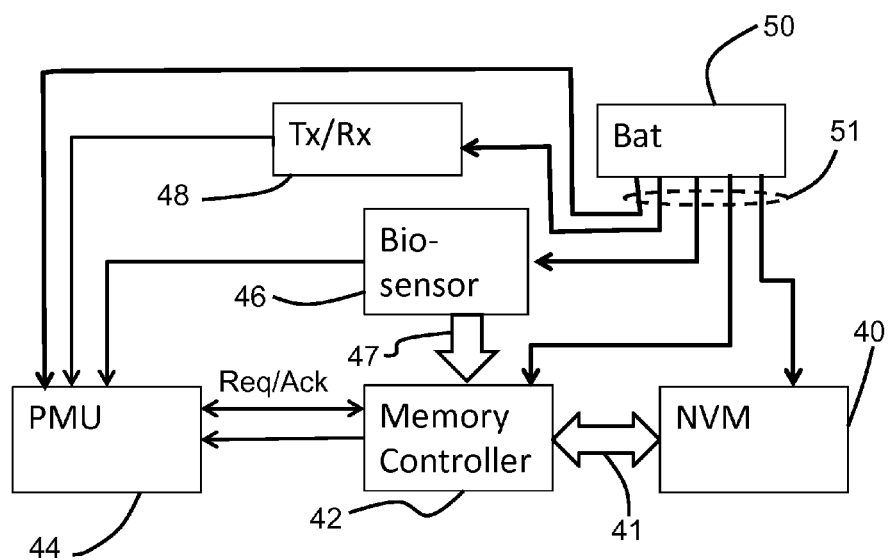
FIG. 4 shows an example device.

FIG. 4 shows an example device. The device comprises a non-volatile memory 40, and a memory controller 42 for controlling reading of data 41 from the memory and writing of data to the memory. The memory controller 42 communicates with a power management unit ("PMU") 44, which is aware of the power demand of all units of the device. The memory controller 42 and power management can together be considered to comprise a memory control system.

The device has at least one additional unit which consumes significant power, such as a biosensor 46. The biosensor provides sensor data 47 to the memory controller 42, which fills a write buffer with the data, to perform a block memory write each time the write buffer is full.

The device can have any number of other power consuming units, such as a wireless transceiver 48 as also shown. The device may be a portable battery operated device and comprising a battery power source 50. The power supply lines to the various units are shown as group 51. It is understood that the power source may be also an energy or power harvesting unit generating the necessary power to the device.

The memory controller 42 has a communications channel to the power management unit 44, which is used for the sending power requests and receiving acknowledgements, as explained further below.

The power management unit 44 can set a maximum power budget that cannot be exceeded, and it maintains real-time information about the power consumption of the other units in the system. For this purpose, each unit in the system is in communication with the PMU so that the PMU can monitor the instantaneous power consumption within the system.

Figure 5:
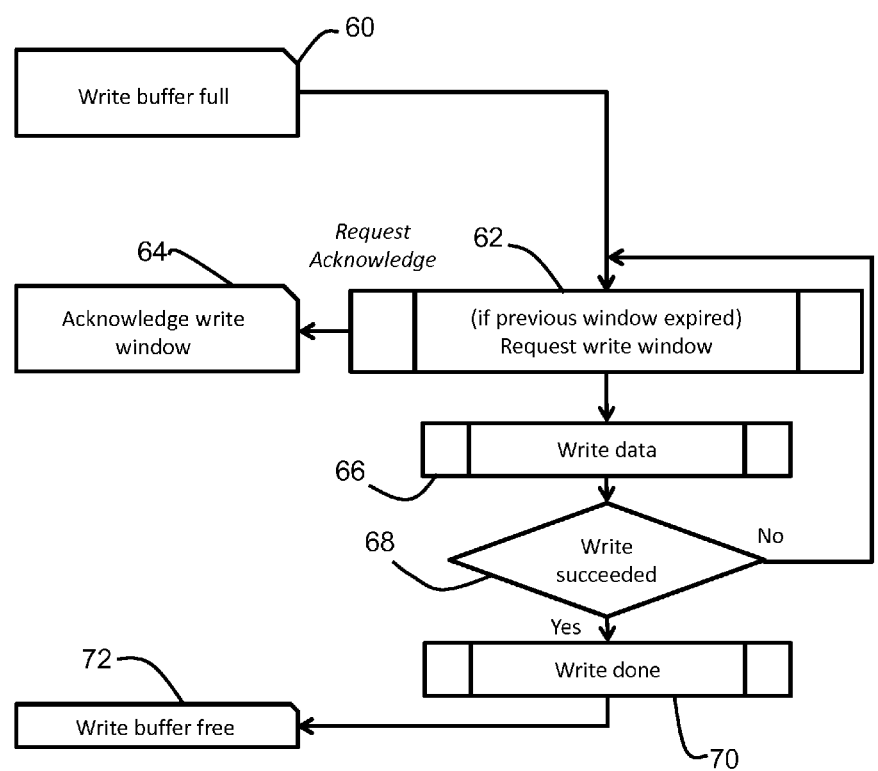
FIG. 5 shows an example of method of providing a write cycle.

FIG. 5 shows the method of providing a write cycle. In step 60, a write buffer of the memory controller 42 is full. The memory controller then requests a time window for writing the buffer to the memory 40, in step 62. This request is sent to the PMU, and only when acknowledgement is given in step 64 is a write cycle 66 performed by the memory controller.

There is a determination in step 68 of whether the write cycle has been successful (in conventional manner for a flash memory). If the cycle has been successful, the block write is complete (step 70) which is reported to the PMU. The write buffer is then free for a next write cycle, as shown by step 72.

If the write attempt is not successful, the memory controller does not automatically proceed to a further attempt or a reallocation of memory location. Instead, the memory controller returns to the step 62 of requesting a write window. In this way, the PMU knows the time which will be taken for the memory access with a much smaller range of uncertainty, so that the power demand can be managed much more accurately and efficiently.

If there are multiple write failures, a new block is selected for writing. This requires additional write cycles, which are handled in the same way as above.

The step 68 of determining a correct write cycle can most simply comprise the read cycle described below. However, a more advanced controller can observe the currents flowing or voltage levels to perform verification while writing. Depending on the realization, the internal controller may either try to re-write a limited data set, or may have to go back to a full write operation.

Figure 6:
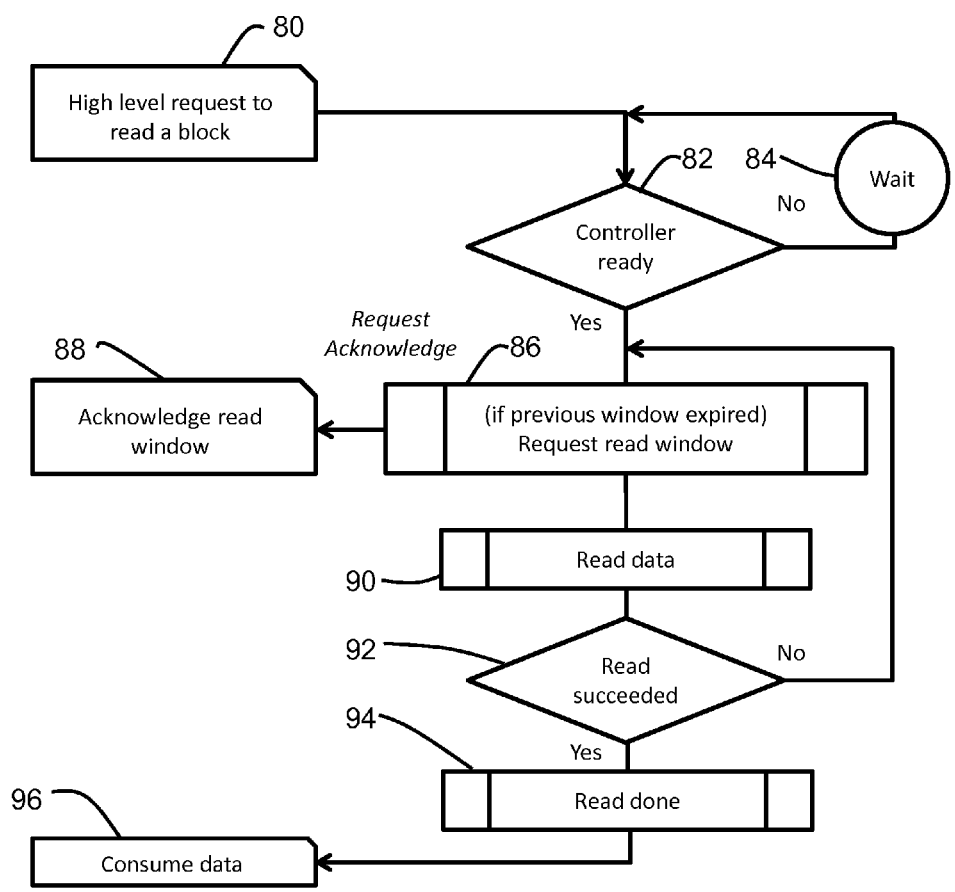
FIG. 6 shows an example of method of providing a read cycle.

FIG. 6 shows the method of providing a read cycle. It is analogous to the write cycle operation.

A high level request to read a block from the memory is made in step 80. The memory controller prepares for the memory read operation, with a waiting loop defined by the steps 82, 84. The wait function 84 is carried out unit the controller is determined to be ready in step 82.

The memory controller requests to the PMU a read window in step 86, and when the request is acknowledged by the PMU in step 88, the read function 90 is performed.

The success of the read is determined in step 92.

The data in the memory is protected by error-correcting code. Besides error correction, the codes also cover detection of a range of errors without the capability of correcting those errors. One such principle is applying a CRC signature to the page as redundant information. Reading multiple times can help to resolve a read error, if the error is not a hard failure but a transient one. Thus, re-reading can help to observe a "correctable" data set, when considered as a probabilistic process.

If the read function is not successful, a further read cycle is carried out. The process returns to step 86 so that a further request and acknowledgement protocol is followed before the next read cycle.

When the read is successful, the read operation is complete in step 94, and the data is used in step 96.

Note that the block size for reading data is not necessarily the same as the block size for writing data. Indeed, typically individual bytes can be read whereas only blocks of data can be written.

In this process, there is synchronized control of the memory controller to read or write data at assigned moments in time by using a request scheme to ensure that there is memory access power consumption only in allotted time intervals.

Some embodiments can tolerate the long writing time in the case of a write failure, by having a deterministic power envelope based on sub-cycles of the write operation.

In particular, these sub-cycles (a single read or write access) have a duration (or a range of possible durations) which is known. The PMU has knowledge of possible read/write windows so that read/write request from the memory controller can be acknowledged at the beginning of such a time window.

Some embodiments are of interest for devices which have a maximum power budget, and which make use of storage of data into a non-volatile memory. The maximum power budget may result from thermal considerations, when the system can only dissipate a specific amount of heat generated, or it may result from maximum ratings of the power supply unit, that only supplies a certain maximum output power. This is especially true in the case of battery operated devices.

By controlling the timing of power demands, the total power budget can be limited to the maximum individual requirement.

It has been explained above that the read or write operations have a duration depending on the number of cycles required. In addition, the duration of writing or reading a block is also dependent of the actual location of the block. This is due to the physical organization of the memory. Although, the duration varies for this reason, it follows a specific pattern as a function of the accessed addresses. As a result, the memory controller can also factor this into the decision of whether to allow a read or write request. The write operation can also be divided into smaller units than a complete block write, so that use can be made of smaller available time periods. In this way, a write operation can be paused and resumed.

Some embodiments are of particular interest for wireless sensor devices. For a wireless sensor device, the read-out power can be much higher, so that the control of the write operation is of particular interest. The read transfer speed should preferably be high, such as at least 100 Mb/sec, and for this reason flash memory is of particular interest.

The example above is based on a simple request and acknowledgement scheme, by which the memory controller simply requires confirmation that it can proceed with a read or write cycle. However, more complicated systems are possible. For example, when requesting a time window for a read or write operation, the PMU can respond with an available time period, or a number of individual cycles that can be performed. The memory controller then only needs to seek further acknowledgement when the time period has expired or the number of cycles has been attempted. This is shown in steps 62 and 86 by the statement "if previous window expired" in FIGS. 5 and 6. This condition does not apply to the most basic embodiment where there is a request and acknowledgement cycle every time.

It can be seen that in the more complicated version, the authorization is not conducted every cycle, but the authorization nevertheless is at the level of each cycle. For example, the acknowledgement may authorize the next two cycles, or may indicate a time period within which three cycles can fit, and in this way authorization for those cycles is granted. This approach results in more complex signaling, but avoids the need for communication at the level of each cycle.

The language in the claims "to authorize or prevent the memory controller from the write operation at the level of the write cycles write cycles" should be understood accordingly, in that the authorization is not necessarily given for each individual cycle, but may be given to sets of cycles. These cycles are still a sub-set of the full write or read operation.

The request/acknowledgement scheme has been explained as based on the timing of sensor data collection. It may also take account of the transmit or receive function, or indeed any other function implemented by the circuit which demands energy resource.

Various other modifications will be apparent to those skilled in the art.

The invention claimed is:

1. A memory control system for controlling read and write operations of a non-volatile memory, wherein the memory control system comprises:
   a memory controller, which is adapted to implement a write operation for writing at least one block of data to the memory as a sequence of memory write and validation cycles for part of all of the data, wherein the number of cycles is a function of the amount of successfully written data per cycle and is thus variable in dependence on the success of the data writing; and
   a power management unit, which is adapted to authorize or prevent the memory controller from conducting the write operation at the level of a set of one or more write cycles thereby to control the timing of power consumption resulting from the cycles of the write operation, wherein the set of write cycles is a subset of the total write cycles for the write operation.

2. The memory control system according to claim 1, wherein the memory controller is adapted to conduct the set of write cycles by:

requesting to the power management unit a time period for conducting the set of write cycles;

receiving an acknowledgement from the power management unit to conduct the set of write cycles; and responsive to receiving the acknowledgement, attempting the write cycle or set of write cycles, wherein if successful reporting the success to the power management unit, and if not successful conducting a new set of cycles.

3. The memory control system according to claim 1 wherein the memory controller is adapted to implement a read operation for reading at least one block of data from the memory as a sequence of memory read and validation cycles for part or all of the data, wherein the number of cycles is a function of the amount of successfully read data per cycle and is thus variable in dependence on the success of the data reading, wherein the power management unit is adapted to authorize or prevent the memory controller from conducting the read operation at the level of a set of one or more read cycles thereby to control the timing of power consumption resulting from the cycles of the read operation, wherein the set of read cycles is a subset of the total read cycles for the read operation.

4. The memory control system according to claim 3, wherein the memory controller is adapted to conduct the set of read cycles by:

requesting to the power management unit a time period for conducting the set of read cycles;

receiving an acknowledgement from the power management unit to conduct the set of read cycles; and responsive to receiving the acknowledgement, attempting the set of read cycles, wherein if successful reporting the success to the power management unit, and if not successful conducting a new set of cycles.

5. A memory system, comprising:
a non-volatile memory; and
the memory control system according to claim 1 for controlling read and write access to the memory.

6. The memory system according to claim 5, wherein the non-volatile memory comprises a flash memory.

7. A device, comprising:
the memory system according to claim 5;
a main functional unit for performing a device function, wherein the power management unit is adapted to authorize or prevent in dependence on the power demand of the main functional unit.

8. The device according to claim 7, wherein the main functional unit comprises a bio-sensor and a wireless transmission module.

9. The device according to claim 8, comprising a biopotential monitoring device.

10. A method of controlling read and write operations of a non-volatile memory, comprising:

implementing a write operation for writing at least one block of data to the memory as a sequence of memory write and validation cycles for part of all of the data, wherein the number of cycles is a function of the amount of successfully written data per cycle and is thus variable in dependence on the success of the data writing; and authorizing or preventing a memory controller from conducting the write operation at the level of a set of one or more write cycles thereby to control the timing of power consumption resulting from the cycles of the write operation, wherein the set of write cycles is a subset of the total write cycles for the write operation.

11. The method according to claim 10, comprising, for the set of write cycles:

requesting to a power management unit a time period for conducting the set of write cycles;

receiving an acknowledgement from the power management unit to conduct the set of write cycles; and responsive to receiving the acknowledgment, attempting the set of write cycles, wherein if successful reporting the success to the power management unit, and if not successful requesting to the power management unit a time period for conducting a new set of cycles.

12. The method according to claim 10 comprising:

implementing a read operation for reading at least one block of data from the memory as a sequence of memory read and validation cycles for part or all of the data, wherein the number of cycles is a function of the amount of successfully read data per cycle and is thus variable in dependence on the success of the data reading; and authorizing or preventing a memory controller from conducting the read operation at the level of a set of one or more read cycles thereby to control the timing of power consumption resulting from the cycles of the read operation, wherein the set of read cycles is a subset of the total read cycles for the read operation.

13. The method according to claim 12, comprising, for the set of read cycles:

requesting to a power management unit a time period for conducting the set of read cycles;

receiving an acknowledgement from the power management unit to conduct the set of read cycles;

responsive to receiving the acknowledgment, attempting the set of read cycles, wherein if successful reporting the success to the power management unit, and if not successful requesting to the power management unit a time period for conducting a new set of cycles.

14. The method according to claim 10 for controlling read and write operations of a flash memory of a device which comprises a main functional unit for performing a device function, wherein the method comprises authorizing or preventing in dependence on the power demand of the main functional unit.

15. A biopotential monitoring method comprising writing sensed biopotential monitoring data to a memory using the method according to claim 10.

16. A method of controlling operations of a non-volatile memory, comprising:

implementing a write operation for writing one block of data to the memory using a plurality of memory write cycles, wherein the block of data represents the smallest size data set to be written to the memory in one write operation;

dividing the write operation into subsets of one or more individual write cycles of the plurality of write cycles for the write operation; and authorizing or preventing a memory controller from conducting the write operation at the level of the subsets of write cycles thereby to control the timing of power consumption resulting from the cycles of the write operation.

* * * * *